(12) United States Patent
Shen et al.

(10) Patent No.: US 9,721,126 B2
(45) Date of Patent: Aug. 1, 2017

(54) MAGNETIC BAR CODE CHIP AND READING METHOD THEREOF

(71) Applicant: MultiDimension Technology Co., Ltd., Zhangjiagang (CN)

(72) Inventors: Weifeng Shen, Zhangjiagang (CN); Songsheng Xue, Zhangjiagang (CN); Zhimin Zhou, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 0 days.

(21) Appl. No.: 14/917,802

(22) PCT Filed: Sep. 10, 2014

(86) PCT No.: PCT/CN2014/086229
§ 371 (c)(1),
(2) Date: Mar. 9, 2016

(87) PCT Pub. No.: WO2015/035911
PCT Pub. Date: Mar. 19, 2015

(65) Prior Publication Data
US 2016/0217308 A1    Jul. 28, 2016

(30) Foreign Application Priority Data
Sep. 10, 2013    (CN) .......................... 2013 1 0409311

(51) Int. Cl.
*G06K 19/00*    (2006.01)
*G06K 7/08*    (2006.01)
*G06K 19/06*    (2006.01)

(52) U.S. Cl.
CPC ....... *G06K 7/087* (2013.01); *G06K 19/06028* (2013.01); *G06K 19/06187* (2013.01); *G06K 19/06196* (2013.01)

(58) Field of Classification Search
USPC .............. 235/435, 439, 454, 462, 487, 494
See application file for complete search history.

(56) References Cited

U.S. PATENT DOCUMENTS 5,965,214 A * 10/1999 Crossfield .............. G01V 15/00
427/130

FOREIGN PATENT DOCUMENTS

CN    1458619    11/2003
CN    1560792    1/2005
(Continued)

OTHER PUBLICATIONS

"International Application No. PCT/CN2014/086229, International Search Report and Written Opinion mailed Dec. 15, 2014", (Dec. 15, 2014), 10 pgs.

*Primary Examiner* — Matthew Mikels
(74) *Attorney, Agent, or Firm* — Schwegman Lundberg & Woessner, P.A.

(57) ABSTRACT

Disclosed are a magnetic bar code chip and a reading method thereof. The magnetic bar code chip comprises binary information bits formed by N rows and M columns of permanent magnet bars and/or null bits, and information identification bits that are peripheral to the binary information bits. The information identification bits are composed of permanent magnet bar identifiers and used for representing a position and a state of the magnetic bar code chip. The permanent magnet bars and the null bits represent 1 and 0 or 0 and 1 respectively. During reading, a strong magnetic field in a row direction of the binary information bits of the magnetic bar code chip is firstly used to set a magnetization direction of the permanent magnet bars, and then a magnetic bar code reader such as a multi-channel magnetic field gradient sensor, a magneto-optical microscope, a magnetic field monitor, a scanning magnetoresistivemicroscope and the like is used to convert magnetic field distribution infor- (Continued)

mation generated by the permanent magnet bars on the magnetic bar code chip into the binary information bits and information identification bits respectively, thus implementing reading on a reading result of the magnetic bar code chip. The present invention has characteristics of a small size and strong security.

18 Claims, 6 Drawing Sheets

(56) References Cited

FOREIGN PATENT DOCUMENTS

| | | |
|---|---|---|
| CN | 1826539 | 8/2006 |
| CN | 101142598 | 3/2008 |
| CN | 103473589 | 12/2013 |
| CN | 203894783 | 10/2014 |
| WO | WO-2015/035911 | 3/2015 |

* cited by examiner

Fig. 4

MAGNETIC BAR CODE CHIP AND READING METHOD THEREOF

PRIORITY CLAIM TO RELATED APPLICATIONS

This application is a U.S. national stage application filed under 35 U.S.C. §371 from International Application Serial No. PCT/CN2014/086229, which was filed 10 Sep. 2014, and published as WO2015/035911 on 19 Mar. 2015, and which claims priority to Chinese Application No. 201310409311.9, filed 10 Sep. 2013, which applications and publication are incorporated by reference as if reproduced herein and made a part hereof in their entirety, and the benefit of priority of each of which is claimed herein.

TECHNICAL FIELD

The present invention relates to the field of bar code technology, and in particular, to a magnetic bar code chip and a reading method thereof.

BACKGROUND ART

Bar code technology is mainly implemented on the surface of an article or as a label on its encapsulation or package. It contains information related to properties of the article itself, such as place of origin, type, name, price, and so on. The corresponding digital identification of a traditional bar code is often represented by a set of parallel rows, the information of which is implemented by changing a row width and a gap therebetween, which is referred to as a linear or one-dimensional bar code information system. In addition, bar code technology has also been developed into a two-dimensional bar code system, which includes rectangle, dot, hexagon, and other geometric patterns. This type of bar code can be identified by using a special optical scanner, i.e., a bar code reader.

The geometric patterns used within a bar code and the use of an optical bar code reader result in the following problems:

1) the label of the bar code is large in size, usually on theorder of a centimeter, and it thus takes up a large space;

2) the label of the bar code is has poor security, because it can be identified by records or the like, such that that confidentiality requirements cannot be met;

3) the optical reading system has a high requirement for cleanliness of the environment in which the bar code is to be read, it is therefore vulnerable to interference from dust, so that the reading often needs to be performed for multiple times.

SUMMARY OF THE INVENTION

In order to solve the above existing problems, the present invention proposes a magnetic bar code chip. An array composed of permanent magnet bars and/or null bits is fabricated on a wafer by means of microelectronic lithography, wherein the permanent magnet bars and the null bits respectively represent 1 and 0 or 0 and 1. A magnetic bar code chip reader is used to convert the spatial magnetic field distribution generated by the array composed of the permanent magnet bars and/or the null bits into binary information, so as to implement the reading of the chip information. By use of lithography, as well as a high sensitivity magnetic field sensor, the magnetic bar code chip is decreased greatly in size, and can be embedded directly on the article, so as to implement the security function of the chip.

The present invention provides a magnetic bar code chip, which includes binary information bits and information identification bits; the binary information identification bits are an array of N rows and M columns composed of permanent magnet bars and/or null bits, wherein both M and N are integers greater than 1, the permanent magnet bars and the null bits respectively represent 1 and 0 or 0 and 1; the information identification bits are composed of permanent magnet bar identifiers, and are used to represent position and state information of the magnetic bar code chip; the information identification bits are located in a peripheral region of the binary information bits.

Preferably, the magnetic bar code chip is fabricated on a wafer by means of microelectronic lithography.

Preferably, the position and state of the magnetic bar code chip contains the following parameter values: a start position, a row direction, a row gap, number of rows, a column direction, a column gap, and number of columns of the binary information bits.

Preferably, the permanent magnet bar identifiers represent the position and state of the magnetic bar code chip through a position, an orientation, a quantity, a size, a space, or a pattern of arrangement of the permanent magnet bars.

Preferably, the permanent magnet bars are single-layer or multi-layer films made of permanent magnet materials.

Furthermore, the permanent magnet materials are CoPt or CoCrPt.

Preferably, all the permanent magnet bars or null bits on the binary information bits are rectangular patterns and have the same length and the same width, and the array has the same column gap and row gap.

Further, the permanent magnet bars or the null bits in the binary information bits have a width of 10-500 µm, a length of 10-1000 µm, a column gap of the array being 10-2000 µm, and a row gap being 10-2500 µm.

Preferably, the magnetic bar code chip can be fixed on jewelry, a package, or a price tag of the jewelry.

The present invention further provides a reading method of a magnetic bar code chip, that is, during reading the magnetic bar code chip, firstly the magnetic bar code chip is placed in a strong magnetic field to set the magnetization, and then a magnetic bar code chip reader is used for reading the magnetization, so as to convert the the magnetic field generated by the permanent magnet bars or the null bits into the corresponding to the binary information bits on the magnetic bar code chip and magnetic field generated by the permanent magnet bar into binary information representing position and state information of the magnetic bar code chip respectively, thus implementing reading of the magnetic bar code chip.

Preferably, the strong magnetic field for setting the magnetic bar code chip has a field intensity of 3-4 KOe, and the direction of the magnetic field is along the direction of the rows of the binary information bits.

Preferably, the magnetic bar code chip reader is one of a multi-channel magnetic field gradient sensor, a magneto-optical microscope, a magnetic field monitor, or a scanning magnetoresistive microscope.

DESCRIPTION OF THE DRAWINGS

To describe the technical solutions and the technique of the embodiments of the present invention more clearly, the following briefly introduces the accompanying drawings required for describing the technique of the embodiments.

Obviously, the drawings in the following description merely show some embodiments of the present invention, and a person of ordinary skill in the art may still derive alternative drawings from these drawings without creative efforts.

FIG. 4 is a schematic view of an array arrangement of an internal slice of the exposure unit on the wafer and position numbers thereof.

DETAILED DESCRIPTION OF THE EMBODIMENTS

Hereinafter, the present invention is illustrated in detail with reference to the drawings in combination with its embodiments.

Embodiment 1

Figure 1:
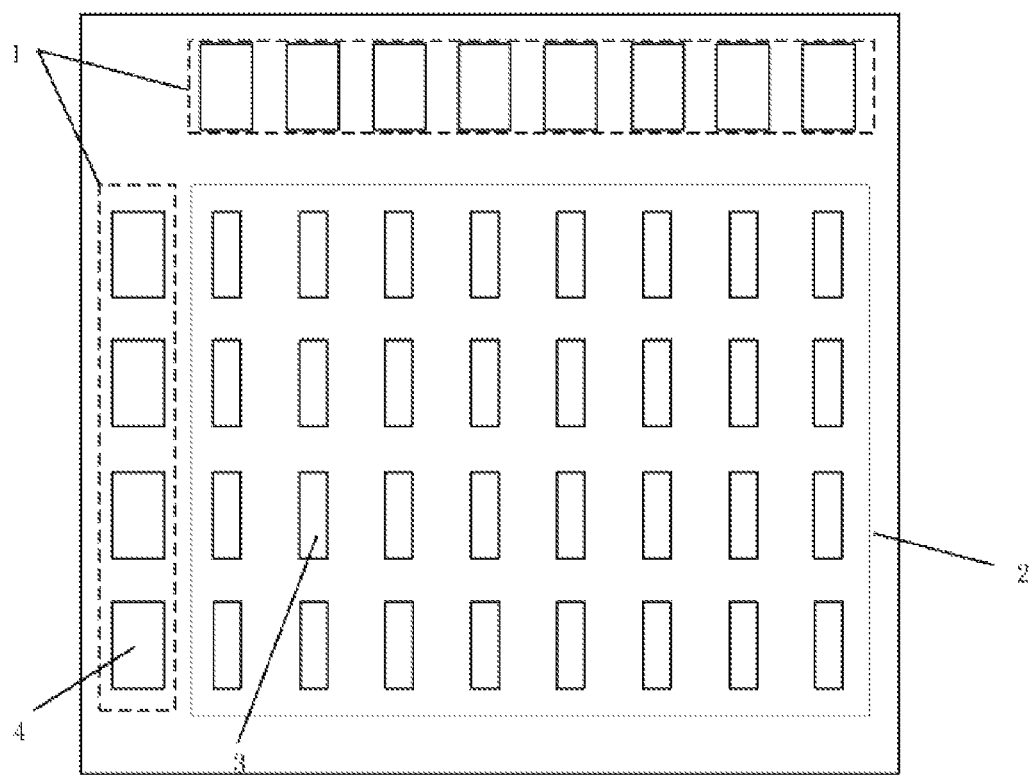
FIG. 1 is a schematic view of a magnetic bar code chip including information identification bits composed of one row and one column of permanent magnet bar identifiers.

FIG. 1 is a schematic structural view of a magnetic bar code chip. The magnetic bar code chip includes N (N>1 and being an integer) rows and M (M>1 and being an integer) columns of binary information bits 2 composed of permanent magnet bars and/or null bits 3, and information identification bits 1 composed of permanent magnet bar identifiers 4, which represent position and state of the magnetic bar code chip, wherein the information identification bits 1 are located in the peripheral area of the binary information bits 2.

In the binary information bits 2, the permanent magnet bars and the null bits respectively represent 1 and 0 or 0 and 1, so as to obtain a binary array of N*M, with an information storage amount up to $2^0$ (N*M).

The permanent magnet identifiers 4 in the information identification bits 1 represent the position and state information of the magnetic bar code chip, including a starting position, number of rows, a row gap, a row direction, number of columns, a column gap, a column direction, and other parameter values of the binary information bits 2. The position and state information of the binary information bits 2 is represented by size, arrangement and orientation, quantity, space, relative positions, and pattern of the permanent magnet bars in the permanent magnet bar identifiers 4.

As shown in FIG. 1, the permanent magnet bar identifiers 4 are composed of a row of permanent magnet bars above the magnetic bar code chip and a column of permanent magnet bars on the left of the magnetic bar code chip, wherein the row and column of the permanent magnet bars respectively include eight and four permanent magnet bars, the permanent magnet bars in the permanent magnet bar identifiers 4 may be in the shape of a rectangle, a triangle, a circle, and a polygon, and may also be a number or a symbol, but are not limited to these shapes, and the size of the permanent magnet bars in the permanent magnet bar identifiers 4 is different from the size of the permanent magnet bars 3 in the binary information bits 2. The following information can be obtained from the above forms of the permanent magnet bar identifiers 4: the starting bit of the binary information bits 2 is located at the coordinate formed at the crossing point between the first column of the permanent magnet bar row and the first row of the permanent magnet bar column in the information identification bits 1, the row direction thereof is along the row direction of the information identification bits 1, the column direction is along the column direction of the information identification bits 1, the row gap and the number of rows of the binary information bits 2 are consistent with the column gap and the number of columns of the information identification bits, and the column gap and the number of columns thereof are consistent with the row gap and the number of rows of the information identification bits. Therefore, even in the case where all the binary information bits 2 are null bits, the number of rows and the number of columns of 0 in the binary information bits 2 can be determined according to the arranging position and state identification information of the permanent magnet identifiers 4 of the information identification bits 1.

In addition, the basic information, such as the starting position, row direction, row gap, number of rows, column gap, column direction, and number of columns of the binary information bits 2 can be indirectly determined by other ways, such as arranging the permanent magnet bars in the information identification bits 1 into a certain pattern, by a method of predefined codes or a certain algorithm.

In the above embodiment 1, all the permanent magnet bars or null bits on the binary information bits 2 are rectangular patterns and have the same length and the same width, and the array has the same column gap and row gap. For example, the permanent magnet bars or the null bits in the binary information bits have a width of 10-500 μm, a length of 10-1000 μm, a column gap of the array being 10-2000 μm, and a row gap being 10-2500 μm. The size of the permanent magnet bars in the permanent magnet bar identifiers 4 is slightly larger than the size of the permanent magnet bars or the null bits in the binary information bits.

The magnetic bar code chip may be fabricated on the wafer by means of microelectronic lithography, and can be embedded directly on an article. Through the use of lithography, as well as a high sensitivity magnetic field sensor, the size of the above magnetic bar code chip is decreased greatly, so as to implement the security function of the chip.

Embodiment 2

Figure 2:
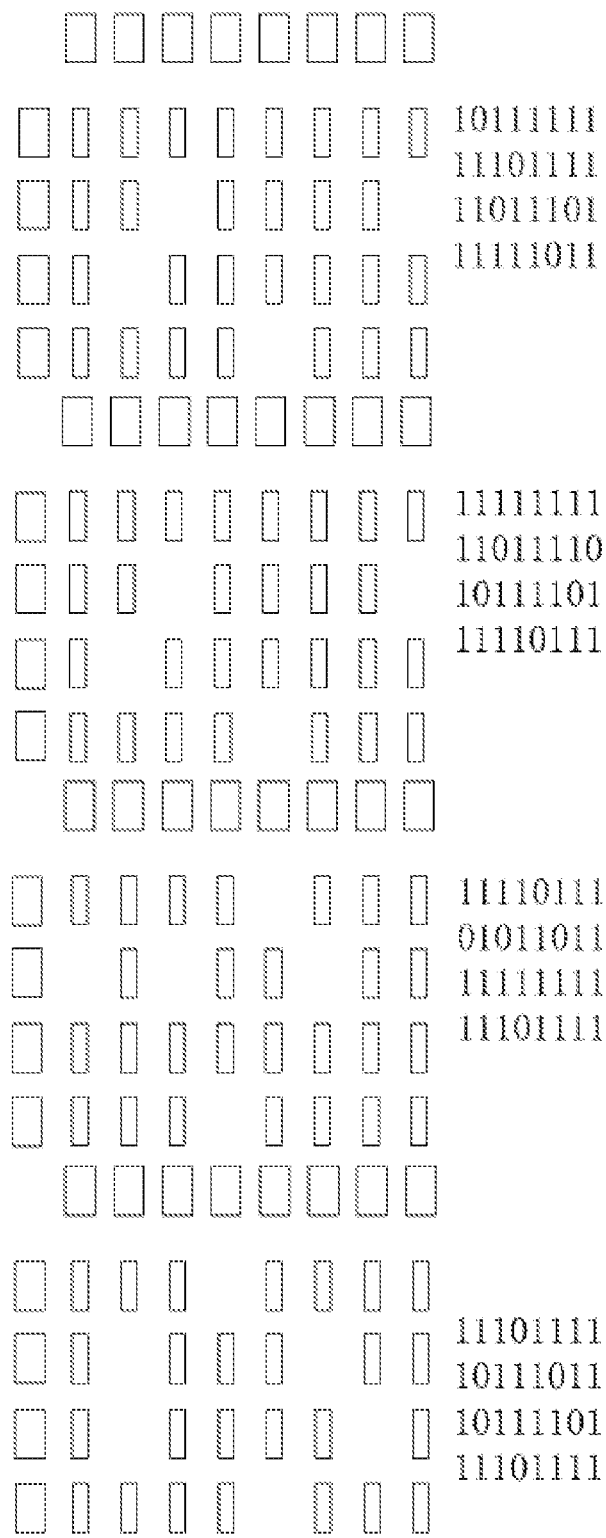
FIG. 2 is a view of distribution information of the permanent magnet bars/null bits in binary information bits and binary information thereof.

FIG. 2 is a schematic view of a different array of the permanent magnet bars/null bits in the information identification bits 2 on the magnetic bar code chip, as well as the corresponding codes thereof, wherein N=4, M=8. Each magnetic bar code chip represents a 32-bit binary array. 1 or 0 can be achieved by placing a permanent magnet bar or a null bit at each position, so as to obtain $2^{32}$ types of different data storage capacities.

Embodiment 3

Figure 3:
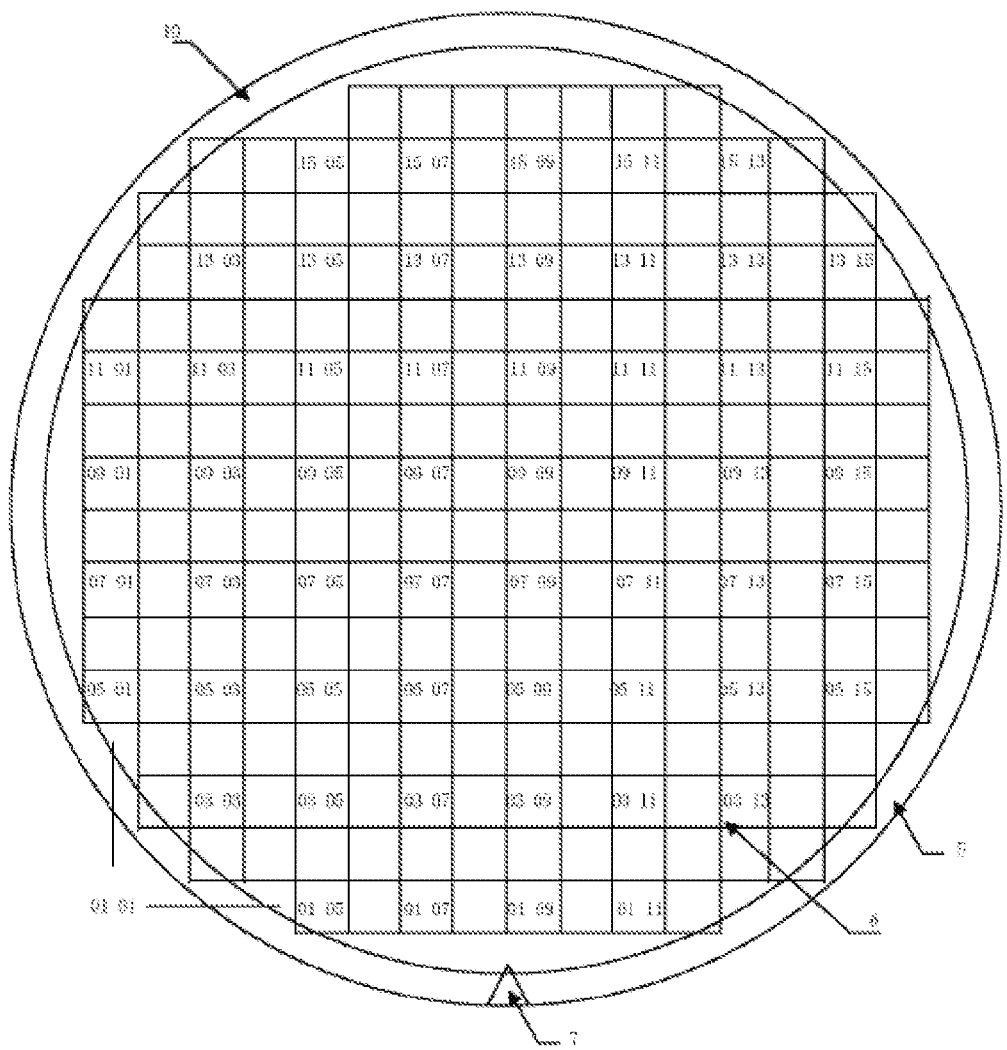
FIG. 3 is a schematic view of an array arrangement of an exposure unit on a wafer and position numbers thereof.
Figure 4:
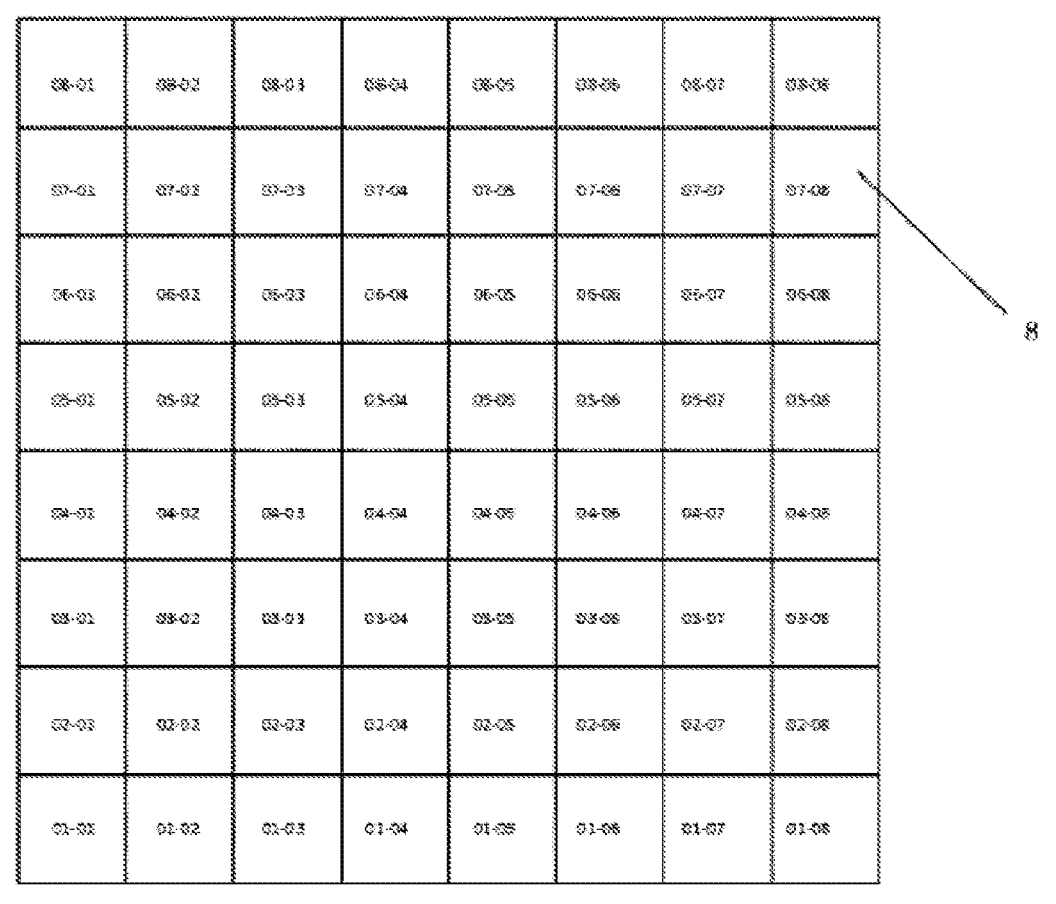
Figure 5:
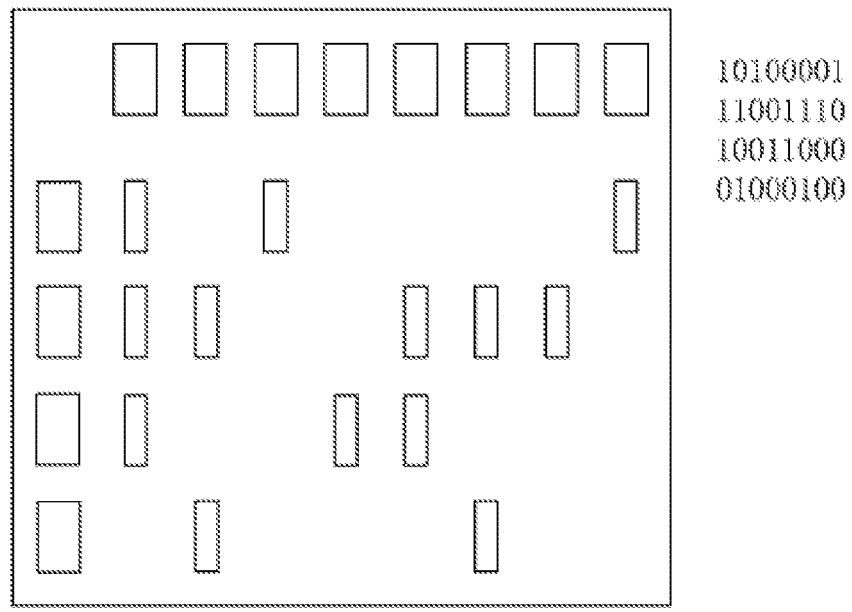
FIG. 5 is a schematic view of the arrangement of the magnetic bar code chip for position numbers of an internal slice of the exposure unit on a certain wafer.

FIGS. 3-5 show one scheme of the magnetic bar code chip applied on position numbers for the internal slice unit of the exposure unit on a 6-inch wafer. First, a wafer number can be represented by making a date on the wafer by a lithography machine. The date is converted into a 16-bit binary format.

For example, the date 2013-05-28 is corresponding to a decimal number 41422 stored in the computer, which is represented as a 16-bit binary of 1010000111001110;

The date 2014-05-31 is corresponding to a decimal number 41790 stored in the computer, and the corresponding binary number is: 1010001100111110;

The date 2016-02-29 is corresponding to a decimal number 42429 stored in the computer, and the corresponding binary number is: 1010010110111101.

FIG. 3 show the information of codes of each corresponding exposure unit 6 on the wafer 10. The wafer 10 is located with a notch 7 facing right downwards, and is divided into a rectangular-box array of 16 rows and 16 columns in total within it including an isolation region 5 in 3-5 mm from the edge of the wafer, each box being an exposure unit 6, with a size of 8 mm×8 mm. A total of 124 effective exposure units are obtained within a wafer effective region beside of the isolation region 5, and the exposure unit is numbered by using a corresponding row-column number, for example the exposure unit located at the first row and first column outside of the effective region can be represented as 01-01, and is represented by a binary number 00010001. Therefore, on the basis that the wafer is marked by the date, each exposure unit 6 is marked through the above 8-bit binary format.

Finally, the codes of the slice units 8 in each exposure unit 6 are shown in FIG. 4, which contains 8 rows and 8 columns of array-type rectangular box slice units in total, and the number of each slice unit can be expressed as the row and column coordinates thereof. A total of 64 slice units exist in the figure, thus the number of the slice unit can be expressed as a row-column number, such as the $8^{th}$ row and the $8^{th}$ column can be expressed as 08-08, and represented as a binary number 10001000. Therefore, on the basis that the date of the wafer and the exposure unit 6 are marked, each slice unit 8 is marked through the 8-bit binary format.

Hence, the code of the slice unit 8 in any one of the corresponding exposure units 6 on a certain wafer can be represented by a 32-bit binary code as follows:

date code (16 bits)+exposure unit code (8 bits)+slice unit code (8 bits).

For example, the 32-bit binary code information of the $4^{th}$ row and $4^{th}$ column of the slice unit 8 in the $9^{th}$ row and $8^{th}$ column of the exposure unit 6 on the wafer corresponding to the date May 28, 2013 is as follows:

10100001
11001110
10011000
01000100

The corresponding pattern of the permanent magnet bars/null bits of the binary information bits 2 on the magnetic bar code chip is then shown in FIG. 5.

Figure 6:
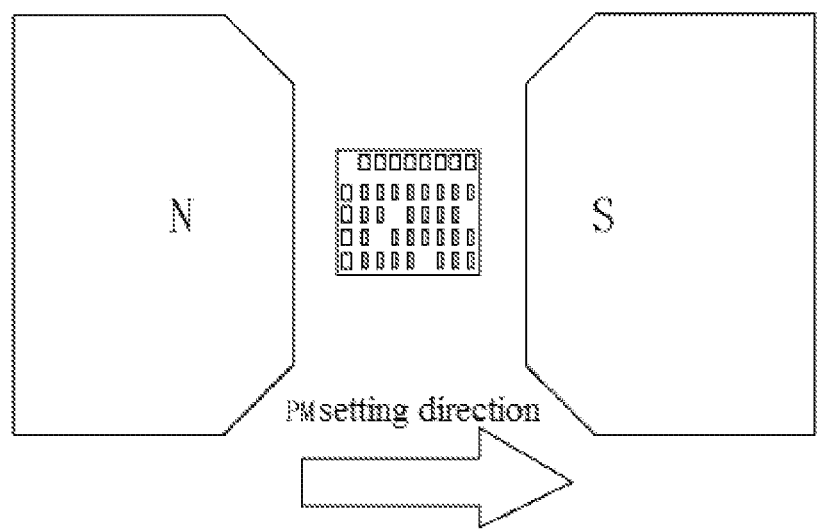
FIG. 6 is a view of setting a magnetic field of the magnetic bar code chip.

FIG. 6 is a schematic view of setting a magnetization direction of the permanent magnet bars on the magnetic bar code chip. During reading the magnetic bar code chip in each of the above embodiments, the magnetic bar code chip needs to be placed in a strong magnetic field, the rows in the binary information bits 2 of the magnetic bar code chip are in the same direction as the magnetic field of the strong magnetic field, and the magnetic field intensity is greater than 3 KOe, and preferably, the field intensity of the magnetic field is 3-4 KOe.

Figure 7:
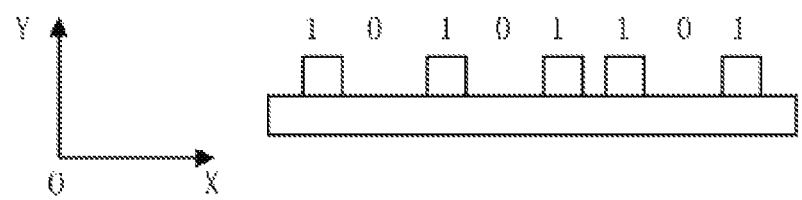
FIG. 7 is a schematic view of a pattern of the permanent magnet bars/null bits in the corresponding binary information bits of the magnetic bar code chip and binary numbers thereof.

FIG. 7 is a pattern of arrangement of a certain row of the permanent magnet bars/null bits of the information identification bits of the magnetic bar code chip, wherein the permanent magnet bars represent 1, and the null bits represent 0.

Figure 8:
FIG. 8 is a distribution view of magnetic field lines of the pattern of the permanent magnet bars/null bits in the corresponding binary information bits of the magnetic bar code chip after the magnetic field is set.

FIG. 8 is a distribution view of magnetic field rows of the pattern of a certain row of the corresponding information identification bits of the magnetic bar code in FIG. 7 after the magnetic field is set, and it can be seen from FIG. 8 that, there is a high density of the magnetic field rows at the corresponding position of the permanent magnet bars in FIG. 7, and a density of the magnetic field rows is very sparse near the corresponding position of the null bits.

Figure 9:
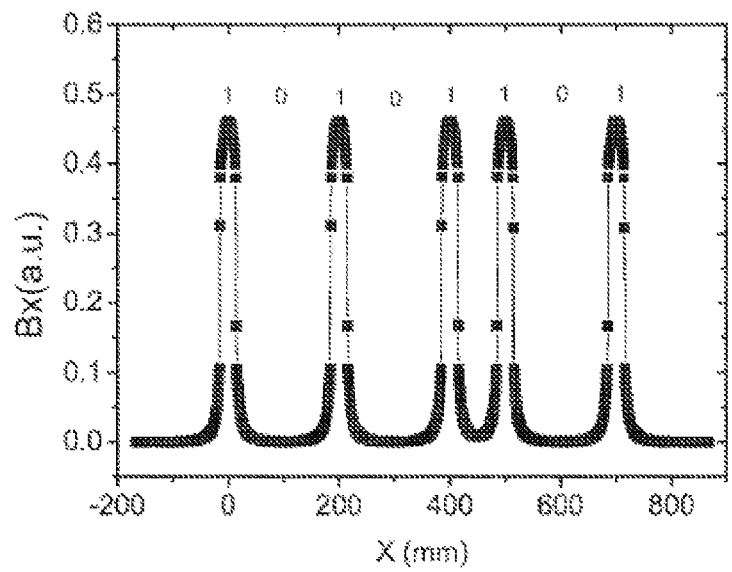
FIG. 9 is a distribution view of the magnetic field along the row direction of the pattern of the permanent magnet bars/null bits in the corresponding binary information bits of the magnetic bar code chip after the magnetic field is set.

FIG. 9 is a distribution view of the magnetic field component along the row direction of the permanent magnet bars generated on the surface of the permanent magnet bars by the pattern of a certain row of the corresponding information identification bits of the magnetic bar code in FIG. 7 after the magnetic field is set. It can be seen that, the intensity of the magnetic field is high near the position of the permanent magnet bars corresponding to 1, and the consistency is good; and the intensity of the magnetic field is small near the position of the null bits corresponding to 0, and is close to 0. Therefore, the reading of the reading result of the magnetic bar code chip can be achieved using a magnetic field detecting device by means of the distribution feature of the amplitude of the magnetic field corresponding to the permanent magnet bars/null bits on the magnetic bar code chip.

A common magnetic field detecting devices include a magneto-optical microscope, a magnetic field monitor, a scanning magnetoresistivemicroscope, a multi-channel gradient magnetic field sensor and the like, which can directly convert the magnetic field distribution information of the magnetic bars/null bits into a 1/0 digital signal for being read.

In addition, if the bar code chip is not encapsulated, the information of the permanent magnet bars/null bits on the bar code chip can be directly observed using an optical microscope, and was converted into 1/0 binary information.

This bar code chip can be placed on a variety of articles with different fixing methods, so as to facilitate classification of the articles and confirmation on the authenticity. For example, it is embedded to jewelry, a package, or price tag of the jewelry to identify the true source and price.

The above description presents preferred embodiments of the present invention, and is not intended to limit the present invention, and for those skilled in the art, the present invention may have various changes and variations. Any modification, equivalent replacement, improvement, and the like made within the spirit and principle of the present invention shall fall under the scope of protection of the present invention.

The invention claimed is:

1. A magnetic bar code chip, the magnetic bar code chip comprising:
   binary information bits and information identification bits;
   the binary information bits being an array of N rows and M columns composed of permanent magnet bars and/or null bits, wherein M and N are integers greater than 1, and the permanent magnet bars and the null bits respectively represent 1 and 0 or 0 and 1;

the information identification bits being composed of permanent magnet bar identifiers, for representing the position and state of the magnetic bar code chip; and the information identification bits being located in a peripheral region of the binary information bits, wherein the permanent magnet bars are single-layer or multi-layer films made of permanent magnet materials.

2. The magnetic bar code chip of claim 1, wherein the magnetic bar code chip is fabricated on a wafer by means of microelectronic lithography.

3. The magnetic bar code chip of claim 1, wherein, the position and state of the magnetic bar code chip contain the following parameter values: a start position, a row direction, a row gap, number of rows, a column direction, a column gap, and number of columns of the binary information bits.

4. The magnetic bar code chip of claim 1, wherein, the permanent magnet bar identifiers represent the position and state of the magnetic bar code chip through a position, an orientation, a quantity, a size, a space, and a pattern of arrangement of the permanent magnet bars.

5. The magnetic bar code chip of claim 1, wherein the permanent magnet materials are CoPt or CoCrPt.

6. The magnetic bar code chip of claim 1, wherein, all the permanent magnet bars or null bits on the binary information bits are rectangular patterns and have the same length and the same width, and the array has the same column gap and row gap.

7. The magnetic bar code chip of claim 6, wherein, the permanent magnet bars or the null bits in the binary information bits have a width of 10-500 μm, a length of 10-1000 μm, a column gap of the array being 10-2000 μm, and a row gap being 10-2500 μm.

8. The magnetic bar code chip of claim 1, wherein, the magnetic bar code chip is fixed on jewelry, a package, or a price tag of the jewelry.

9. A reading method of a magnetic bar code chip that includes binary information bits and information identification bits, the binary information bits being an array of N rows and M columns composed of permanent magnet bars and/or null bits, wherein M and N are integers greater than 1, and the permanent magnet bars and the null bits respectively represent 1 and 0 or 0 and 1, the information identification bits being composed of permanent magnet bar identifiers, for representing the position and state of the magnetic bar code chip, and the information identification bits being located in a peripheral region of the binary information bits, wherein the method comprises placing the magnetic bar code chip in a strong magnetic field to set the magnetic field, and then using a magnetic bar code chip reader to convert the permanent magnet bars or the null bits corresponding to the binary information bits on the magnetic bar code chip and magnetic field information generated by the permanent magnet bar identifiers of the information identification bits into binary information and position and state information of the magnetic bar code chip respectively.

10. The reading method of a magnetic bar code chip of claim 9, wherein, the strong magnetic field for setting the magnetic bar code chip has a field intensity of 3-4 KOe, and the direction of the magnetic field is along the direction of the rows of the binary information bits.

11. The reading method of a magnetic bar code chip of claim 9, wherein, the magnetic bar code chip reader is one of a multi-channel magnetic field gradient sensor, a magneto-optical microscope, a magnetic field monitor, and a scanning magnetoresistive microscope.

12. A structure including a magnetic bar code chip comprising:

binary information bits and information identification bits;

the binary information bits being an array of N rows and M columns composed of permanent magnet bars and/or null bits, wherein M and N are integers greater than 1, and the permanent magnet bars and the null bits respectively represent 1 and 0 or 0 and 1;

the information identification bits being composed of permanent magnet bar identifiers, for representing the position and state of the magnetic bar code chip; and the information identification bits being located in a peripheral region of the binary information bits, wherein the position and state of the magnetic bar code chip contain the following parameter values: a start position, a row direction, a row gap, number of rows, a column direction, a column gap, and number of columns of the binary information bits.

13. The structure of claim 12, further comprising a wafer that includes the magnetic bar code chip in an array magnetic bar code chips arranged in rows and columns.

14. A structure including a magnetic bar code comprising:

binary information bits and information identification bits;

the binary information bits being an array of N rows and M columns composed of permanent magnet bars and/or null bits, wherein M and N are integers greater than 1, and the permanent magnet bars and the null bits respectively represent 1 and 0 or 0 and 1;

the information identification bits being composed of permanent magnet bar identifiers, for representing the position and state of the magnetic bar code chip; and the information identification bits being located in a peripheral region of the binary information bits, wherein the permanent magnet bar identifiers represent the position and state of the magnetic bar code chip through a position, an orientation, a quantity, a size, a space, and a pattern of arrangement of the permanent magnet bars.

15. The structure of claim 14, further comprising a wafer that includes the magnetic bar code chip in an array magnetic bar code chips arranged in rows and columns.

16. A structure including a magnetic bar code chip comprising:

binary information bits and information identification bits;

the binary information bits being an array of N rows and M columns composed of permanent magnet bars and/or null bits, wherein M and N are integers greater than 1, and the permanent magnet bars and the null bits respectively represent 1 and 0 or 0 and 1;

the information identification bits being composed of permanent magnet bar identifiers, for representing the position and state of the magnetic bar code chip; and the information identification bits being located in a peripheral region of the binary information bits, wherein all the permanent magnet bars or null bits on the binary information bits are rectangular patterns and have the same length and the same width, and the array has the same column gap and row gap.

17. The structure of claim 14, wherein the permanent magnet bars or the null bits in the binary information bits have a width of 10-500 μm, a length of 10-1000 μm, a column gap of the array being 10-2000 μm, and a row gap being 10-2500 μm.

18. The structure of claim 16, further comprising a wafer that includes the magnetic bar code chip in an array magnetic bar code chips arranged in rows and columns.

* * * * *